(12) United States Patent
Yamashita et al.

(10) Patent No.: US 7,600,983 B2
(45) Date of Patent: Oct. 13, 2009

(54) RADIAL PLUNGER PUMP AND METHOD FOR MANUFACTURING PUMP HOUSING

(75) Inventors: Yutaka Yamashita, Anjo (JP); Kenichi Suzuki, Nishikamo-gun (JP); Masahiko Abe, Chiryu (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 450 days.

(21) Appl. No.: 11/270,485

(22) Filed: Nov. 10, 2005

(65) Prior Publication Data

US 2006/0104828 A1 May 18, 2006

(30) Foreign Application Priority Data

Nov. 16, 2004 (JP) ............................ 2004-332329
Sep. 27, 2005 (JP) ............................ 2005-280231

(51) Int. Cl.
*F04B 1/04* (2006.01)
*F04B 27/04* (2006.01)

(52) U.S. Cl. ...................... 417/273; 417/570; 29/888.02

(58) Field of Classification Search ................. 417/273, 417/570, 269, 423.14; 123/206, 495, 179.17
See application file for complete search history.

(56) References Cited

U.S. PATENT DOCUMENTS

| | | | | |
|---|---|---|---|---|
| 3,119,340 A | * | 1/1964 | Scibbe | .......................... 74/837 |
| 3,682,572 A | * | 8/1972 | Yarger | ........................ 417/273 |
| 5,382,140 A | * | 1/1995 | Eisenbacher et al. | ........ 417/273 |
| 5,666,921 A | * | 9/1997 | Collingborn | ................. 123/450 |
| 5,876,186 A | * | 3/1999 | Stiefel | .......................... 417/273 |
| 6,183,212 B1 | * | 2/2001 | Djordjevic | ................... 417/273 |
| 6,345,609 B1 | * | 2/2002 | Djordjevic | ................... 123/509 |
| 6,406,272 B2 | | 6/2002 | Ruthardt et al. | |
| 6,464,216 B2 | * | 10/2002 | Weaver et al. | ................ 269/282 |
| 6,588,405 B1 | * | 7/2003 | Streicher et al. | ............. 123/495 |
| 6,817,841 B2 | * | 11/2004 | Frank et al. | .................. 417/273 |
| 7,273,036 B2 | * | 9/2007 | Boos et al. | .................... 123/446 |

FOREIGN PATENT DOCUMENTS

JP 2001-500593 1/2001
WO WO 2004033905 A1 * 4/2004

* cited by examiner

*Primary Examiner*—Devon C Kramer
*Assistant Examiner*—Amene S Bayou
(74) *Attorney, Agent, or Firm*—Buchanan Ingersoll & Rooney PC

(57) ABSTRACT

A pump housing supporting a driving shaft has a plurality of cylinder bores extending radially and arranged at substantially regular intervals around an outer periphery of the driving shaft. Each cylinder bore has a plunger fitted therein, which reciprocates in response to a rotation of the driving shaft. An inlet, an inlet valve, an outlet, and an outlet valve are provided for each plunger. Fluid flowing from an inlet port provided in the pump housing flows into each inlet, and moreover, fluid flowing from each outlet passes through an outlet passage and flows into an outlet port provided in the pump housing. The outlet passage has a plurality of communication holes corresponding to the outlet valves. Outlet ends of the communication holes converge on one spot in the pump housing.

5 Claims, 5 Drawing Sheets

RADIAL PLUNGER PUMP AND METHOD FOR MANUFACTURING PUMP HOUSING

BACKGROUND OF THE INVENTION

1. Field of the Invention

The present invention relates to radial plunger pumps, and particularly, to a radial plunger pump having a plurality of plungers arranged at substantially regular intervals around an outer periphery of a driving shaft, and to a method for manufacturing a pump housing.

2. Description of the Related Art

Japanese Patent Application Laid-Open No. 2001-500593 discloses an example of a radial plunger pump of the above-mentioned type, in which a pump housing is provided for supporting a driving shaft in a rotatable manner. The pump housing has a plurality of cylinder bores extending radially and arranged at substantially regular intervals around the outer periphery of the driving shaft. Each cylinder bore has a plunger fitted therein, which reciprocates in response to the rotation of the driving shaft.

In the above-described plunger pump, an inlet, an inlet valve, an outlet, and an outlet valve are provided for each plunger. Fluid flowing from an inlet port provided in the pump housing passes through an inlet passage and flows into each inlet. Moreover, fluid flowing from each outlet passes through an outlet passage and flows into an outlet port provided in the pump housing.

According to such a conventional radial plunger pump described above, the outlet passage has a plurality of communication holes corresponding to the outlet valves. Outlet ends of the communication holes are connected to different sections of the outlet port. For this reason, the conventional radial plunger pump has a plurality of connecting sections between the communication holes and the outlet port. In other words, the radial plunger pump has a plurality of sections where burrs are formed. This means that a burr-removal process is necessary for each of the connecting sections between the communication holes and the outlet port, which is problematic in view of work efficiency and reliability.

SUMMARY OF THE INVENTION

In order to solve the problem mentioned above, the present invention provides a radial plunger pump including a pump housing rotatably supporting a driving shaft. The pump housing has a plurality of cylinder bores extending radially and arranged at substantially regular intervals around an outer periphery of the driving shaft. Each cylinder bore has a plunger fitted therein, the plunger reciprocating in response to a rotation of the driving shaft. An inlet, an inlet valve, an outlet, and an outlet valve are provided for each plunger. Fluid flowing from an inlet port provided in the pump housing passes through an inlet passage and flows into each inlet. Fluid flowing from each outlet passes through an outlet passage and flows into an outlet port provided in the pump housing. The outlet passage has a plurality of communication holes corresponding to the outlet valves. Outlet ends of the communication holes converge on one spot in the pump housing. Furthermore, the converging spot of the outlet ends of the communication holes may be disposed in a connection hole connected to an accumulator attachment hole, which is disposed in the pump housing and communicates with the outlet port.

According to the radial plunger pump of the present invention, the outlet passage has the plurality of communication holes corresponding to the outlet valves, and moreover, the outlet ends of the communication holes converge on one spot in the pump housing. Accordingly, since the outlet ends of the communication holes are joined at one spot, only one section where burrs are formed is present, thereby achieving better work efficiency for removing burrs and higher reliability. In a case where the converging spot of the outlet ends of the communication holes is disposed in the connection hole connected to the accumulator attachment hole communicating with the outlet port, the converging spot of the communication holes may also be joined to the accumulator attachment hole.

Furthermore, according to the present invention, the communication holes may be given substantially the same length. In this case, the communication holes can be formed at the same angle with respect to the shaft axis of the driving shaft. Accordingly, when the plurality of communication holes is to be formed in the pump housing using a single hole-forming device, the pump housing is rotated around the shaft axis of the driving shaft by predetermined intervals without changing the fixed angle of the hole-forming device with respect to the shaft axis of the driving shaft. In a state where the pump housing is fixed in position at each interval, the hole-forming process using the hole-forming device is performed (the hole-forming device is moved at the fixed angle). By repeating the hole-forming process at the predetermined intervals, the communication holes are formed sequentially in the pump housing. In this case, the processing direction using the hole-forming device and the processing angle are kept constant so that the plurality of communication holes can be formed equiangularly in the pump housing with respect to the shaft axis of the driving shaft. Furthermore, in this case, the discharge resistance can be made substantially the same, thereby stabilizing the discharging pulses.

Furthermore, according to the present invention, the plungers may include at least three plungers. Moreover, the accumulator attachment hole disposed in the pump housing and communicating with the outlet port may intersect with (e.g. perpendicular to) an axis line of the driving shaft. The communication hole disposed closest to the accumulator attachment hole may have a length greater than those of the remaining communication holes. The converging spot of the communication holes may be positionally shifted from a shaft axis of the driving shaft in a radial direction thereof (or in other words, shifted away from an accumulator fitted in the accumulator attachment hole). In this case, the longest communication hole can be inclined closer to an end of the driving shaft, thereby preventing an interference between the communication hole and the accumulator attachment hole and also contributing to size reduction of the pump housing in the axial direction of the driving shaft.

Furthermore, the present invention also provides a method for manufacturing a pump housing including at least three pumps centered on a driving shaft and extending radially therefrom, at least three pumps having outlets disposed at an equal distance from the driving shaft; and communication holes extending from the corresponding outlets to an accumulator and arranged at an equal angle with respect to the driving shaft. The method includes the step of repetitively rotating the pump housing around the driving shaft and moving a hole-forming device from the outlets at the equal angle with respect to the driving shaft so as to form the communication holes.

In this method for manufacturing a pump housing, when the plurality of communication holes is to be formed in the pump housing using a single hole-forming device, the hole processing can be achieved without changing the fixed angle of the hole-forming device with respect to the shaft axis of the driving shaft. Accordingly, the pump housing can be manufactured readily.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Figure 1:
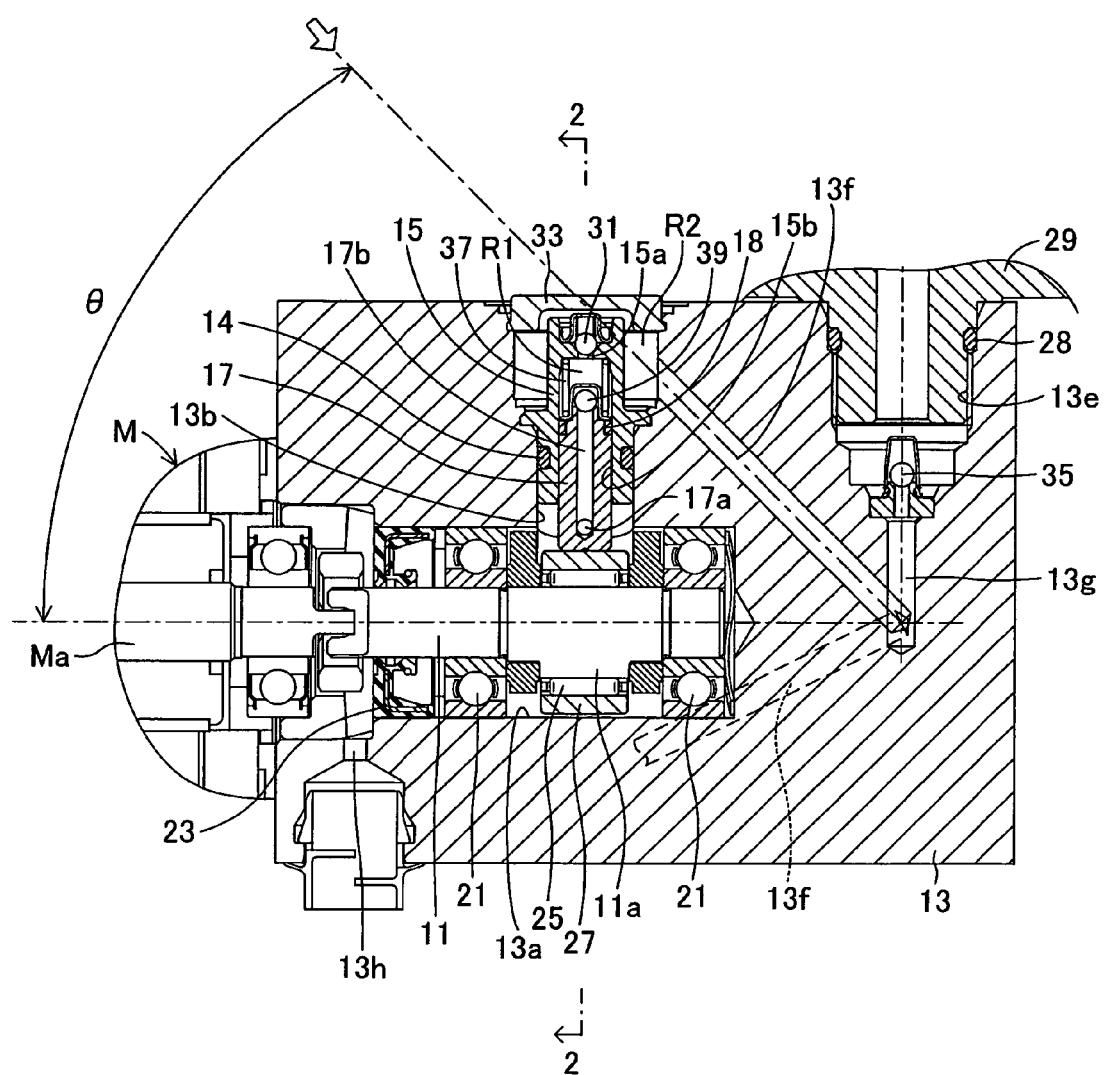
FIG. 1 is a vertical sectional view of a radial plunger pump according to a first embodiment of the present invention.
Figure 2:
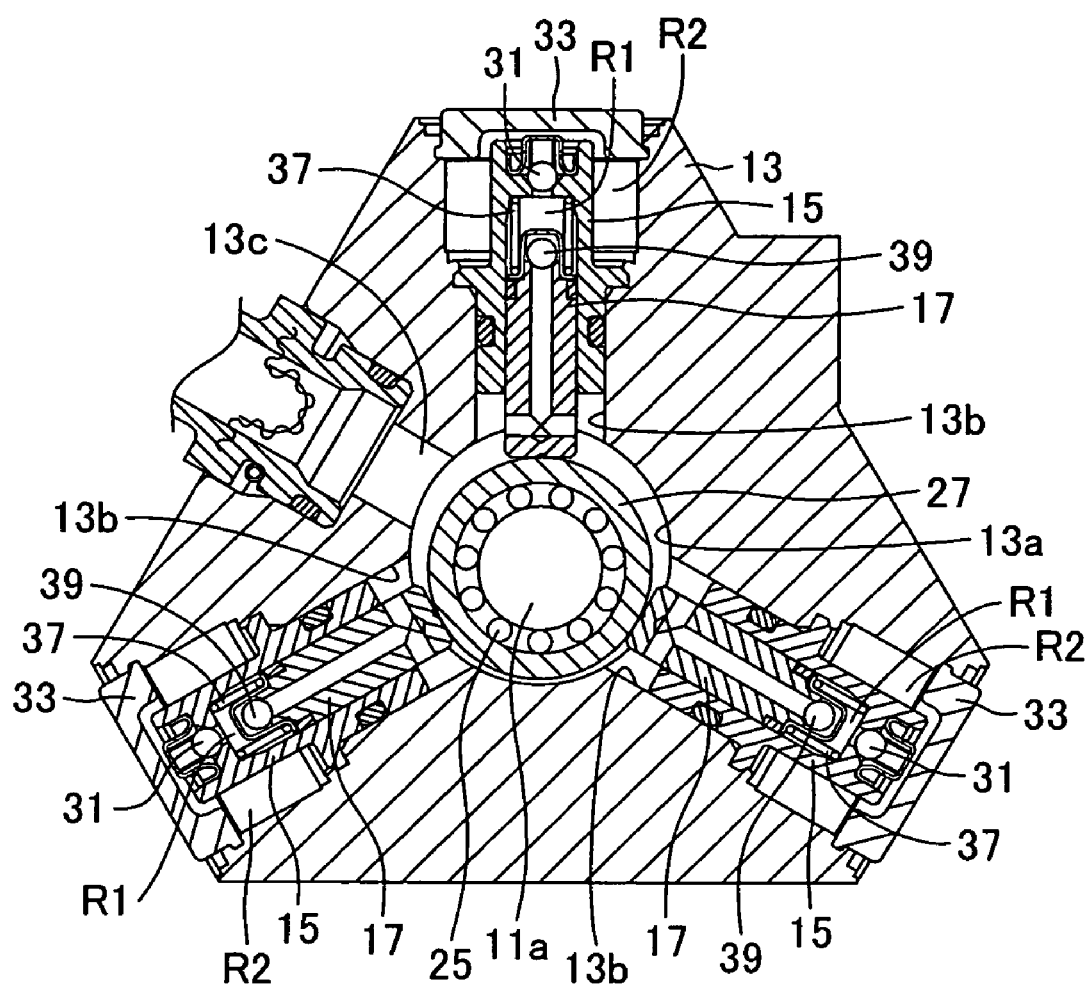
FIG. 2 is a cross-sectional view of the radial plunger pump taken along line 2-2 in FIG. 1.
Figure 3:
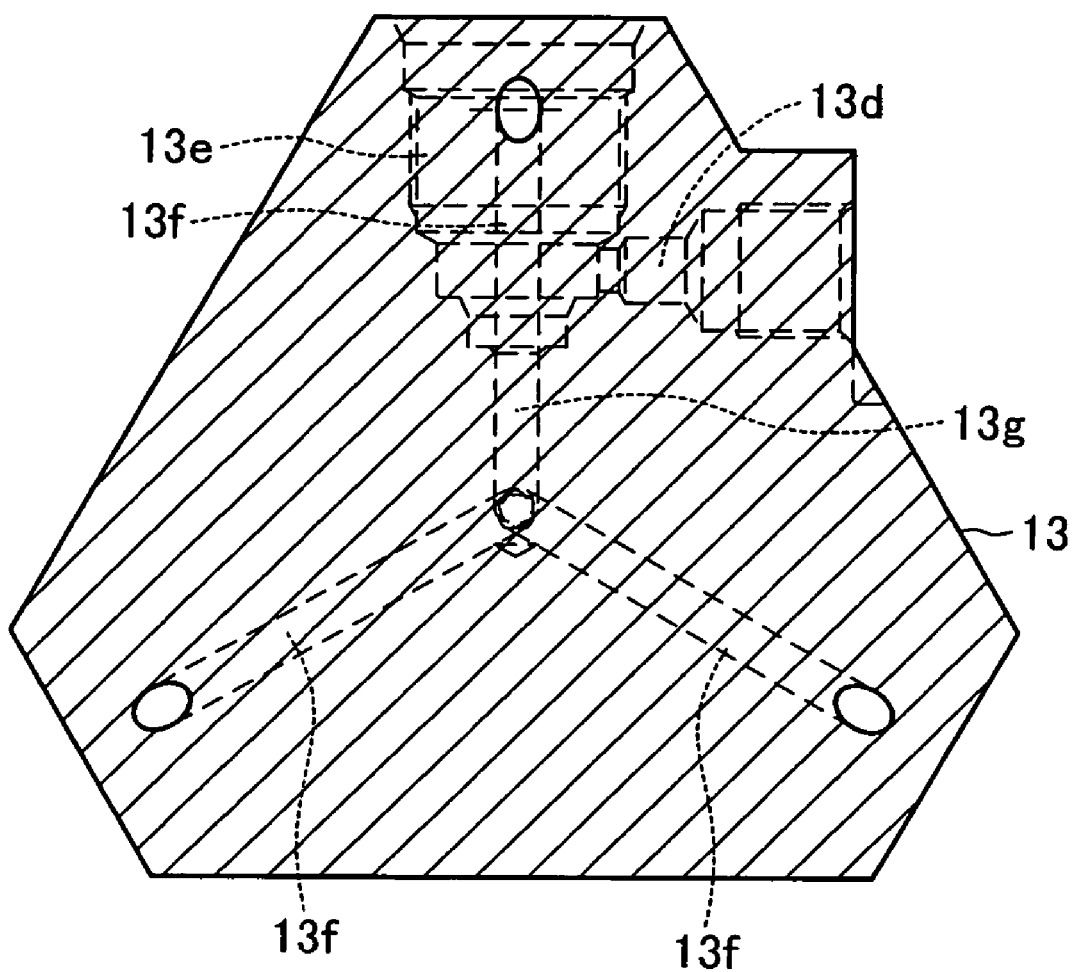
FIG. 3 is a cross-sectional view illustrating a relationship among communication holes, a connection hole, an accumulator attachment hole, and an outlet port included in a pump housing shown in FIG. 1.

The present invention will now be described with reference to the drawings. FIGS. 1 to 3 illustrate a radial plunger pump according to a first embodiment. The radial plunger pump according to the first embodiment includes a driving shaft 11 rotated by an output shaft Ma of an electric motor M, and a pump housing 13 rotatably supporting the driving shaft 11. The pump housing 13 has three cylinders 15 and three plungers 17 fitted therein. The electric motor M is attached to the pump housing 13.

The driving shaft 11 is fitted in a shaft attachment hole 13a of the pump housing 13 via a pair of ball bearings 21, 21 and a seal ring 23. The central portion of the driving shaft 11 is provided with an eccentric shaft component 11a. The eccentric shaft component 11a moves eccentrically in response to the rotation of the driving shaft 11 around the shaft axis thereof. A driving ring 27 is rotatably fitted around the outer periphery of the eccentric shaft component 11a via a needle bearing 25.

Referring to FIG. 2, the pump housing 13 has a plurality of cylinder attachment holes 13b arranged radially at substantially regular intervals in the circumferential direction of the eccentric shaft component 11a of the driving shaft 11. Inner ends of the cylinder attachment holes 13b communicate with the shaft attachment hole 13a. Moreover, the pump housing 13 also has an inlet port 13c extending radially without overlapping the cylinder attachment holes 13b. An inner end of the inlet port 13c communicates with the shaft attachment hole 13a.

Furthermore, referring to FIGS. 1 and 3, the pump housing 13 has an outlet port 13d and an accumulator attachment hole 13e disposed substantially perpendicular to each other. An accumulator 29 is fitted in the accumulator attachment hole 13e in a fluid-tight manner via a seal ring 28. Furthermore, the pump housing 13 has three communication holes 13f and one connection hole 13g via which outer end portions of the cylinder attachment holes 13b and an inner end of the accumulator attachment hole 13e communicate. The pump housing 13 also has a drain port 13h for drainage.

Each communication hole 13f is formed by drilling a hole inward at an angle from the outer end of the corresponding cylinder attachment hole 13b by using a hole-forming device, such that one end of the communication hole 13f positioned at a predetermined distance from the shaft axis (center of rotation) of the driving shaft 11 communicates with the corresponding cylinder attachment hole 13b, while the other end (i.e. an outlet end) communicates with the connection hole 13g. Moreover, the ends of the communication holes 13f that communicate with the connection hole 13g converge on one spot inside the pump housing 13 (i.e. a spot positioned on an extension of the shaft axis of the driving shaft 11). The communication holes 13f have substantially the same length. On the other hand, the connection hole 13g is formed by drilling a hole coaxially with the accumulator attachment hole 13e by using a hole-forming device. The accumulator attachment hole 13e communicates with the outlet port 13d and extends substantially perpendicular to the axis line of the driving shaft 11.

The cylinders 15 are fitted in the cylinder attachment holes 13b of the pump housing 13 in a fluid-tight, immovable manner via seal rings 14. The cylinders 15 extend radially around the outer periphery of the driving shaft 11. Each cylinder 15 forms a pump chamber R1 together with the corresponding plunger 17. Moreover, each cylinder 15 is provided with an outlet 15a and an outlet valve 31, such that a fluid (hydraulic fluid) discharged from the pump chamber R1 and passing through the outlet 15a and the outlet valve 31 flows into an outlet chamber R2 defined by the pump housing 13 and a cap 33.

The fluid flowing into each outlet chamber R2 travels through an outlet passage defined by the corresponding communication hole 13f and the connection hole 13g and also through an outlet check valve 35 attached to the outlet end of the connection hole 13g. As a result, the fluid flows into the accumulator attachment hole 13e and also into the outlet port 13d via the accumulator attachment hole 13e.

The plungers 17 are fitted in cylinder bores 15b of the cylinders 15 in a fluid-tight manner via seal rings 18, and are also movable in the axial direction of the cylinders 15. Each plunger 17 and the corresponding cylinder 15 have a spring 37 disposed therebetween, such that the spring 37 biases the plunger 17 radially towards the driving shaft 11. An inner end of the plunger 17 is engaged to an outer periphery of the driving ring 27. Accordingly, the eccentric shaft component 11a of the driving shaft 11 and the springs 37 operate in cooperation with each other so as to reciprocate the plungers 17 axially within the cylinders 15 in response to the rotation of the driving shaft 11, thereby increasing and decreasing the volume of the pump chambers R1.

Each plunger 17 is provided with an inlet 17a, an inlet passage 17b, and an inlet valve 39. The fluid from the inlet port 13c flows into the shaft attachment hole 13a also serving as an inlet passage, and is introduced into the pump chambers R1 via the inlets 17a, the inlet passages 17b, and the inlet valves 39.

In the radial plunger pump according to the first embodiment, when the driving shaft 11 is rotated by the output shaft Ma of the electric motor M, the eccentric shaft component 11a of the driving shaft 11 and the springs 37 operate in cooperation with each other so as to reciprocate the plungers 17 axially within the cylinders 15 in response to the rotation of the driving shaft 11. Consequently, the volume of the pump chambers R1 is increased and decreased, whereby the fluid sucked into the inlet port 13c is discharged to the accumulator attachment hole 13e and the outlet port 13d.

On the other hand, in the radial plunger pump according to the first embodiment, the outlet ends of the communication holes 13f provided in the pump housing 13 converge on one spot inside the pump housing 13. Accordingly, since the outlet ends of the communication holes 13f are joined at one spot, only one section where burrs are formed is present, thereby achieving better work efficiency for removing burrs and higher reliability.

Furthermore, in the radial plunger pump according to the first embodiment, the communication holes 13f are given substantially the same length, and the outlet ends of the communication holes 13f are joined at a spot positioned on the extension of the shaft axis of the driving shaft 11. Thus, the communication holes 13f are formed at the same angle (i.e. an angle formed with respect to the shaft axis of the driving shaft 11 by using a hole-forming device). When the plurality of communication holes 13f is to be formed in the pump housing 13 using a single hole-forming device (a hole-forming drill, not shown), the pump housing 13 is rotated around the shaft axis of the driving shaft 11 by predetermined intervals (120°) without changing the fixed angle θ (see FIG. 1) of the hole-forming device with respect to the shaft axis of the driving shaft 11. In a state where the pump housing 13 is fixed in position at each interval, the hole-forming process using the hole-forming device is performed (the hole-forming device is moved at the fixed angle θ). By repeating the hole-forming process at the predetermined intervals, the communication holes 13f are formed sequentially in the pump housing 13. In this case, the processing direction (the direction indicated by an arrow in FIG. 1) using the hole-forming device and the processing angle θ are kept constant so that the plurality of communication holes 13f can be formed equiangularly in the pump housing 13 with respect to the shaft axis of the driving shaft 11. Furthermore, in this case, the discharge resistance can be made substantially the same, thereby stabilizing the discharging pulses.

Figure 4:
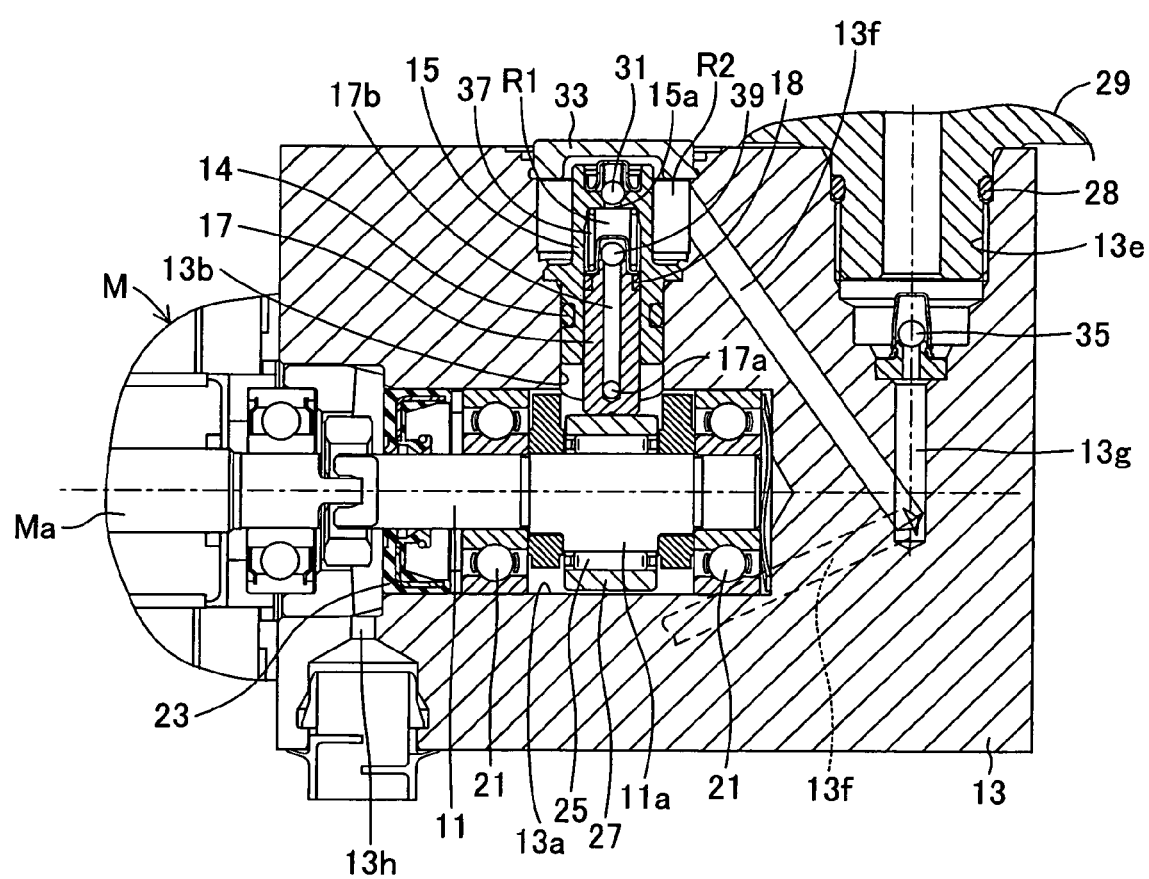
FIG. 4 is a vertical sectional view of a radial plunger pump according to a second embodiment of the present invention.
Figure 5:
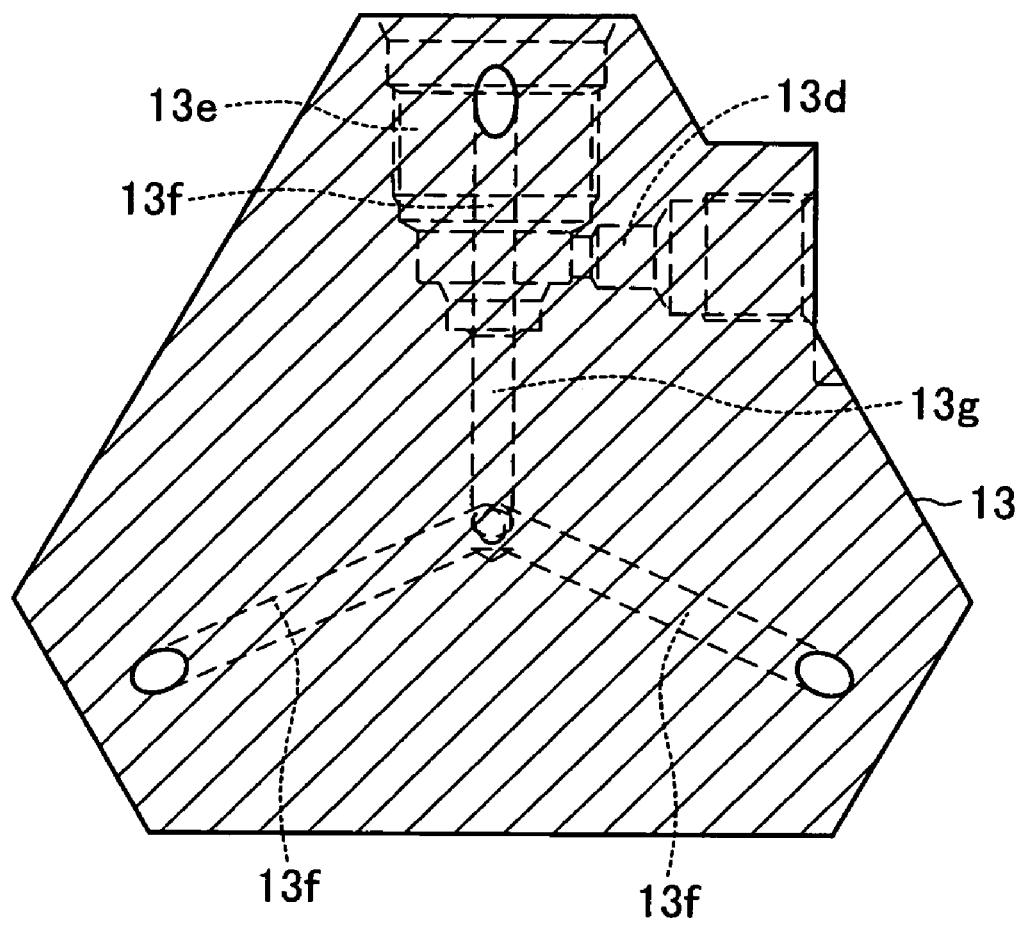
FIG. 5 is a cross-sectional view illustrating a relationship among communication holes, a connection hole, an accumulator attachment hole, and an outlet port included in a pump housing shown in FIG. 4.

According to the first embodiment, as shown in FIGS. 1 and 3, the communication holes 13f are given substantially the same length, and the outlet ends of the communication holes 13f are joined at a spot positioned on the extension of the shaft axis of the driving shaft 11. Alternatively, according to a second embodiment shown in FIGS. 4 and 5, the communication hole 13f closest to the accumulator attachment hole 13e may be given a length that is greater than those of the remaining communication holes 13f, such that the converging spot of the communication holes 13f is shifted from the shaft axis of the driving shaft 11 in the radial direction thereof (or in other words, shifted away from the accumulator 29 fitted in the accumulator attachment hole 13e).

In that case, the longest communication hole 13f can be inclined closer to an end of the driving shaft 11 (right end in FIG. 4), thereby preventing an interference (communication) between the communication hole 13f and the accumulator attachment hole 13e and also contributing to size reduction of the pump housing 13 in the axial direction of the driving shaft 11. In this case, the pump end of the longest communication hole 13f (left end in FIG. 4) may be shifted outward (upward in FIG. 4) so as to achieve further size reduction.

Although the above-described embodiments are directed to a radial plunger pump equipped with three plungers 17 and attachments thereof, the number of the plungers 17 and the attachments thereof is not limited to three as in the above-described embodiments as long as the number is more than one. Furthermore, although the plungers 17 are fitted in the cylinder bores 15b of the corresponding cylinders 15 included in the pump housing 13, the plungers 17 may alternatively be fitted in cylinder bores provided directly in the pump housing 13.

What is claimed is:

1. A radial plunger pump comprising:
    a pump housing rotatably supporting a driving shaft and having a plurality of cylinder bores extending radially and arranged at substantially regular intervals around an outer periphery of the driving shaft, an inlet port sucking in fluid, and an outlet port discharging fluid;
    a plunger fitted in each cylinder bore to form a pump chamber and reciprocating in response to a rotation of the driving shaft;
    an inlet passage through which the inlet port communicates with the pump chamber;
    an outlet passage through which the pump chamber communicates with the outlet port;
    an inlet valve provided for each plunger which establishes and cuts off a communication between the inlet passage and the pump chamber in response to reciprocating motion of the plunger; and
    an outlet valve provided for each plunger which establishes and cuts off a communication between the pump chamber and the outlet passage in response to the reciprocating motion of the plunger, wherein
    the outlet passage has a plurality of outlet chambers each of which is formed by an attachment hole extending radially and accommodating each plunger, and each of which communicates with each pump chamber via each outlet valve, and
    wherein the outlet passage has a plurality of communication holes each of which extends from an inner side surface of each attachment hole in a direction that is not perpendicular to an axis line of the driving shaft, and outlet ends of the communication holes converge on one spot in the pump housing.

2. The radial plunger pump according to claim 1, wherein the pump housing has an accumulator attachment hole communicating with the outlet port, and
    wherein the converging spot of the outlet ends of the communication holes is disposed in a connection hole connected to the accumulator attachment hole.

3. The radial plunger pump according to claim 1, wherein the communication holes are given substantially the same length.

4. The radial plunger pump according to claim 2, wherein the plungers comprise at least three plungers,
    wherein the accumulator attachment hole disposed in the pump housing and communicating with the outlet port intersects with an axis line of the driving shaft,
    wherein the communication hole disposed closest to the accumulator attachment hole has a length greater than those of the remaining communication holes, and
    wherein the converging spot of the communication holes is positionally shifted from a shaft axis of the driving shaft in a radial direction thereof.

5. The radial plunger pump according to claim 1, wherein the direction is not perpendicular to a straight line that passes through the one spot and is parallel to the axis line of the driving shaft.

* * * * *